Nov. 8, 1966    E. L. KOLM ETAL    3,284,064
APPARATUS FOR RECOVERY OF HEAT AND CHEMICALS
Filed March 28, 1963
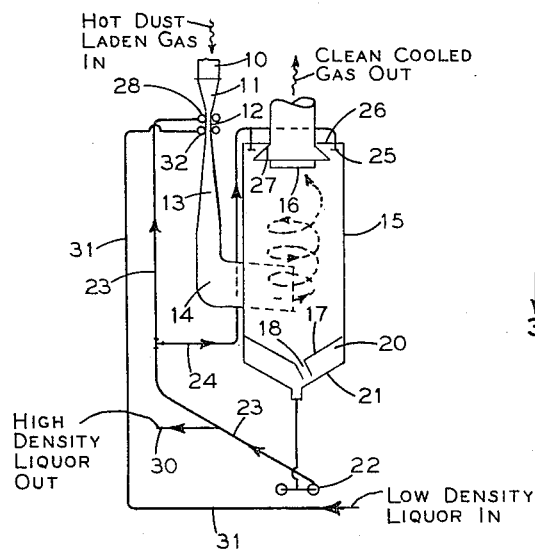
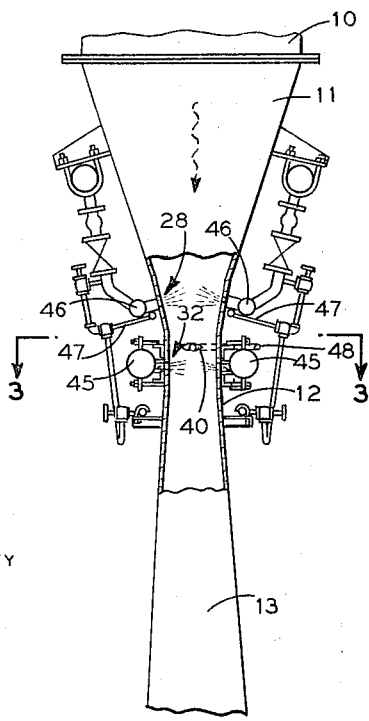
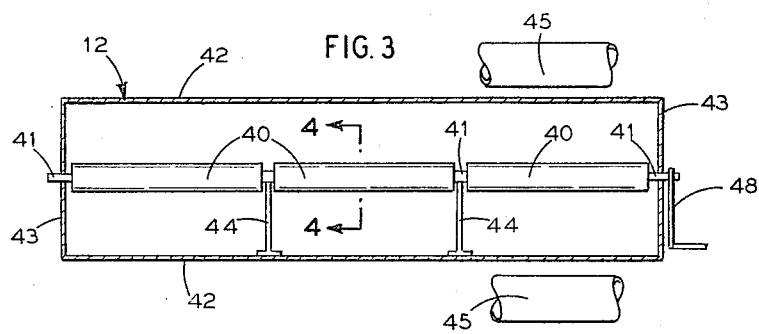
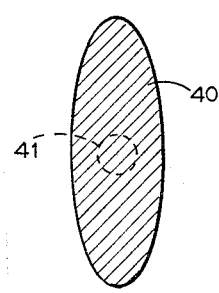
INVENTORS
Ernest L. Kolm
BY William J. Darmstadt
ATTORNEY United States Patent Office 3,284,064
Patented Nov. 8, 1966

3,284,064
APPARATUS FOR RECOVERY OF HEAT
AND CHEMICALS
Ernest L. Kolm, Alliance, and William J. Darmstadt, Akron, Ohio, assignors to The Babcock & Wilcox Company, New York, N.Y., a corporation of New Jersey
Filed Mar. 28, 1963, Ser. No. 268,666
2 Claims. (Cl. 261—62)

This invention relates to an apparatus for the recovery of heat and solids from a hot gas laden with entrained dust particles or chemical fume, and more particularly to an apparatus for maintaining a high dust removal efficiency over a range of gas flow rates.

In many industrial processes the gases produced contain chemicals in the form of dust or fume which it is desirable to separate out to recover chemical compounds and/or to eliminate a dust nuisance. When the gases in addition contain heat values, it may also be of economic importance to reclaim at least some of the heat in the gases. The desirability of both heat and chemical recovery is exemplified in the pulp and paper industry applications where the effluent gases from the incineration of the pulp residual liquor from, for example, the sulphate process, contain both chemical fume and heat values.

It is known that the dust or fume in gases discharged from a smelting furnace used in the chemical recovery of residual liquor may be removed from the gases by use of a venturi scrubber-cyclone separator unit such as shown in U.S. Patent 2,879,838. It is also known that the fume may be removed from the hot gases by intimate contact between the hot gases and a sprayed liquid such as water or brine. The intimate contact is attained by the acceleration of the gases to a high velocity, such as 175 ft. per second, whereby the high velocity gases atomize the relatively coarse spray of liquid introduced into the gas stream. When the gases contacted by the liquid are at a relatively high temperature, considerable quantities of the spray liquid will be evaporated. Under these circumstances, the liquid droplets atomized in the venturi scrubber will agglomerate and absorb the fume in the gases. Thereafter, the agglomerated particles may be separated from the gases in the cyclone separator portion of the unit. It is also known that the fume may be removed from the effluent gases by the use of residual pulp liquor as the contacting medium. Thus, under these circumstances, not only is the fume removed from the entraining gases but in reclaiming heat the residual liquor is also concentrated by the evaporation of moisture therefrom so that the liquor may thereafter be used directly in the incinerating furnace. However, efficient use of residual liquor as a spray medium necessitates increasing the velocity of the gases passing through the throat of the venturi scrubber with consequent increase in pressure drop. The increased pressure drop is in part due to the higher viscosities or the liquor (compared to water or brine) and is also due in part to the higher velocities which are needed to suitably atomize the sprayed liquor. While many scrubber installations generally are operated at normal design gas flow rates, with only occasional periods of operation at reduced gas flow rates, some installations are actually operated under varying gas flow rates as a usual operating condition. Gas flow rates at less than design values result in reduced pressure drop through the venturi scrubber and may also result in reduced dust collection efficiency. Within limits, collection efficiencies at reduced gas flow rates can be partially maintained by increasing the rate of liquor flow to the venturi scrubber, to thereby increase the pressure drop across the scrubber. However, the benefits resulting from increasing the flow of liquor, which may be recirculated from a separator, is limited by other factors such as the increased gas cooling effect due to the introduction of additional moisture into the gas stream and the increased circulating pump power requirements.

In accordance with this invention we have found that the collection efficiency of venturi-scrubber apparatus can be maintained at reduced gas flow rates by reducing the cross-sectional flow area generally in correspondence with reduction in flow and thus maintain the gas flow velocity in that portion of the scrubber where intimate mixing of the gas and fluid is taking place. We have also found that the means for adjusting the cross-sectional flow area within the venturi-scrubber can advantageously be positioned within the flow path and these means may be centered along the longitudinal axis of the gas flow path. Surprisingly, such a location is free from any tendency for the deposition of solids on the adjusting means when the liquor spray nozzles are positioned upstream, in a gas flow sense, of the adjustable flow area reducer. The reducer may take the form of a streamlined adjustable vane which may be rotated to vary the gas flow area within the venturi in the vicinity of the flow area reducer.

The various features of novelty which characterize our invention are pointed out with particularity in the claims annexed to and forming a part of this specification. For a better understanding of the invention, its operating advantages and specific objects attained by its use, reference should be had to the accompanying drawings and descriptive matter in which we have illustrated and described a preferred embodiment of the invention.

Of the drawings:
FIG. 1 is a schematic showing of a venturi scrubber-cyclone separator constructed and arranged in accordance with this invention;
FIG. 2 is an enlarged view of a portion of the venturi scrubber shown in FIG. 1;
FIG. 3 is a cross-section of the venturi scrubber throat portion shown in FIG. 2 taken along line 3—3; and
FIG. 4 is a sectional view of the adjustable vane taken along line 4—4 of FIG. 3.

As shown in FIG. 1, a venturi scrubber-cyclone separator unit of the general type shown in U.S. Patent 2,879,838 is diagrammatically illustrated. The hot gases received from, for example, the incinerating furnace of a residual liquor recovery unit (not shown) enter the venturi scrubbed through a duct 10. The gases pass through a converging inlet portion 11 wherein they are accelerated prior to entering the throat portion 12 of the scrubber. After leaving the throat portion 12, the gases, with entrained liquids and agglomerated solids, pass through a diverging portion 13, a turning duct portion 14 and tangentially enter the cyclone separator 15. Within the cyclone 15, the gases whirl in a spiraling, upward direction to pass through a central gas outlet duct 16 in the upper end of the cyclone. The whirling action of the gases, in passing through the cyclone, causes centrifugal separation of the entrained solid and liquid particles from the gases, with those particles concentrating at and striking the wall of the cyclone, and then by gravity action collecting in an inverted frusto-conical false bottom 17 in the cyclone. The false bottom is provided with a central outlet 18 which discharges into a sump 20 formed between the frusto-conical false bottom and the lower inverted frusto-conical bottom plate 21 of the cyclone 15.

Since some of the particles separated in the cyclone may have a tendency to accumulate on the interior surfaces of the cyclone, wall washing means are provided. As shown, residual liquor is delivered from a pump 22 through pipe 23 and branch pipe 24 to a series of nozzles 25 positioned immediately adjacent the top cover plate 26 of the cyclone separator 15. A frusto-conical shield or skirt 27 encircles the duct 16, forming the gas outlet from the separator, with its lower edge portion inwardly spaced from the interior surface of the wall defining the cyclone. The nozzles 25 discharge the wall washing liquor into the annular space above the frusto-conical skirt 27 causing the liquir to move downwardly along the wall of the cyclone, with the mixture discharging to the sump 20 through the central opening 18 of the false bottom 17.

As shown in FIG. 1, the residual liquor supplied to nozzles 28 in the venturi throat 12 is supplied through pipe 23′ from pipe 23 on the discharge side of the pump 22. The pump suction receives liquor from the sump 20 in the cyclone separator. A second branch pipe 30 leads from the pipe 23 to the point of use, which in the case of a pulp recovery system would be the spray nozzle supplying the incinerating furnace of the heat and chemical recovery unit (not shown). The liquor withdrawn from the sump in the bottom of the cyclone separator and delivered to the spray nozzles of an incinerating furnace will ordinarily have a concentration of the order of 60 to 65% solids, for self-sustaining combustion of the liquor in the incinerating furnace.

When the liquor delivered to the venturi throat 12 has a solids content of the order of 60%, the density of the liquor is approximately 82 lbs. per cubic foot and the viscosity will be about 600 Saybolt Universal seconds at 200 F. Under these conditions, satisfactory atomization of the liquor will occur with a gas velocity of 175 ft. per second (or greater) through the throat 12, and 85% to 90% of the dust or fume in the gas delivered to the scrubber-separator unit will be reclaimed. Under these conditions the gas flow pressure drop through the unit will be of the order of 33 to 35 inches of water pressure.

Substantially the same dust removal efficiency can be obtained when passing the gases through the unit using a spray liquid which has a viscosity approaching that of water. For this condition the gas flow velocity may be greatly reduced with a corresponding reduction in pressure drop to the order of 15 inches of water pressure. However, it is economically desirable to use residual and/or makeup liquor as the spray medium since the heat in the gas will then be utilized to concentrate the liquor and thus save the cost of steam or other evaporative means necessary to concentrate the liquor to a solids content satisfactory for processing in the incinerating furnace.

The efficiency of dust or fume removal in the scrubber separator unit is dependent upon the intimacy of contact between the liquid droplets and the dust or fume particles in the venturi, and upon the fineness of the liquid droplets available in the venturi throat. Since high gas velocities are necessary to suitably atomize the liquid introduced into the venturi, it should also be noted that increasing the viscosity of the liquid produces a corresponding increase in the gas pressure drop.

Make-up liquor supplied to the scrubber-separator combination is obtained, in the case of a pulp and paper installation, from a multiple effect evaporator, where the liquor is concentrated to a solids content of between 40% and 50%. The amount of liquor used as make-up will depend upon the rate of liquor withdrawal through the pipe 30 for delivery to the incinerating furnace. For high efficiency dust removal the makeup liquor at, for example, a solids concentration of 45% is delivered through a pipe 31 to nozzles 32 positioned in the venturi throat downstream, in a gas flow sense, of the nozzles 28. It will be understood that the higher the viscosity (or the density) of the liquor delivered to the venturi throat, the greater the velocity of gas flow necessary through the throat 12 to attain atomization of the liquor and agglomeration of the fine dust particles in the gas.

Since the effectiveness of liquid atomization of the venturi throat is dependent upon substantially constant gas velocity and, in the main, upon the viscosity of the liquid introduced thereto, the lower density, lower viscosity makeup liquor may be effectively used to accomplish efficient removal of fume or dust from the gas while at the same time effectively concentrating the liquor by evaporation to a satisfactory value for subsequent use in the incinerating furnace.

It will be understood that the rate of liquor flow to the venturi scrubber will be as much as 10 or more times the rate of liquor flow to the incinerating furnace in order to attain the necessary degree of dust removal and liquor evaporation for the purpose described. For example, the liquor to gas ratio in the scrubber may be of the order of 20 gal./1,000 cu. ft., whereas the rate of makeup liquor flow to the nozzles 32 may be as little as 2 gal./1,000 cu. ft. of gas. While the makeup liquor, i.e. the low viscosity liquor, may be introduced into the scrubber upstream of the nozzles which receive the recirculated high viscosity liquor, the preferred arrangement is as shown in the drawings where the nozzles 32 are downstream of the nozzles 28. The latter arrangement is preferred to protect the low flow rate nozzles from the plugging effects occasioned by contact with the higher temperature gases entering the venturi.

It will also be noted that using both high and low viscosity liquors in the proportions stated will have but a minor effect on the averaged viscosity of the resulting gas-liquid mixture and in solids reduction of the gas velocity, while still retaining high efficiency dust removal.

When the venturi-scrubber illustrated in the drawings is operated at its designed gas flow rate and with the required liquor flow rates, between 90 and 95% of the liquids and solids entrained in the gas will be separated in the cyclone separation 15 and discharged with the liquid removed through the pump 22. When the flow rate of the gas through the duct 10 is decreased due to reduced rating on the associated incinerating furnace (not shown) the percentage of entrained dust removed from the gas will be reduced, because of the reduction in the velocity of gas flowing through the throat 12. The removal of dust from the gas can be improved to some extent at reduced gas flow rates by increasing the flow rate of liquor through the conduit 23 to the nozzles 28. While such an operation may maintain a desirable pressure drop through the venturi-scrubber, the pump power will be substantially increased and its effectiveness is limited by physical and economic considerations, such as the increased size of nozzle and connecting piping, as well as pump power costs.

We have found it is desirable to install an adjustable restrictor in the throat 12 of a venturi-scrubber so as to adjustably change the cross-sectional flow area therethrough and thus maintain the gas velocity at a desirable value during periods of reduced gas flow rate through the venturi. Some attempts have been made heretofore to change the cross-sectional flow area of a venturi-scrubber so as to control the velocity of gas flowing therethrough. Such attempts have included elaborate mechanical arrangements which have proven to be impractical, and some of the simpler arrangements have encountered difficulties with deposition of solids on the movable portions of the apparatus. We have found, however, that the particular restrictor hereinafter described is entirely effective in regulating the velocity of gas flowing, is simple in construction and operation, and is not subject to the build-up of solids deposits.

As shown in FIGS. 2, 3 and 4 the restrictor 40 is formed as a solid bar of generally elliptical section (see FIG. 4) and is mounted for rotation about its longitudinal axis. With the throat 12 of rectangular gas flow cross-section, as shown in FIG. 3, the restrictor 40 is axially mounted on a shaft 41 extending parallel to the longer sides 42 of the throat and with its opposite ends centered in the shorter sides 43 of the throat. One end of the shaft 41 is extended beyond the adjacent wall 43 to accommodate an arm or crank 48, keyed to the shaft, for rotatably positioning the restrictor 40, thus changing the cross-sectional flow area of the throat 12. When, as shown, the length of the walls 42 is appreciable, intermediate supports such as 44 are desirable to support the shaft 41.

It will be understood that the restrictor 40 may be constructed in any desired shape having a length to width ratio, in cross-section, which is greater than one, such as a plate or leaf configuration. Also, the restrictor may be hollow. Advantageously the shape of the restrictor should be streamlined to provide a minimum of resistance to gas flow when positioned in its open or least restrictive position. It will likewise be apparent the cross-sectional shape of the throat 12 need not be limited to a rectangle as shown, but may be of any desired cross-sectional shape. The rectangular shape is advantageous for spraying liquor into the gas stream passing through the venturi-scrubber, since locating the longitudinally spaced nozzles 28 and 32 in the longer walls 42 promotes uniform distribution of the liquor spray into the gas.

In the embodiment of the invention, the higher flow capacity spray nozzles 28 are positioned upstream, in a gas flow sense, of the throat 12, and the restrictor 40 is positioned in the throat. With this arrangement the hot gases are cooled prior to their contacting the restrictor and they will then contain sufficient moisture which will continually wash the surfaces of the restrictor so that no build-up of solids will occur on the surfaces of the restrictor 40. The lower flow capacity nozzles 32 are positioned in the throat 12 in the vicinity of the restrictor 40 and inject lower viscosity liquor into the higher velocity gas stream with intimate mixing of the gas and liquor. As shown, in FIGS. 1 and 2, the nozzles 32 are supplied with low viscosity liquor from line 31 and headers 45 which are positioned adjacent the longer sides 42 of the throat and are substantially coextensive therewith. The nozzles 28 are supplied with high viscosity recirculated liquor supplied thereto from line 23A and headers 46. In addition, the nozzles 28 are supplied with steam through pipe connections 47, to aid in atomization of the liquor. It will be understood that steam atomization is not essential to attainment of the desirable load-responsive characteristics of the restrictor 40, and that the nozzles 32, under some circumstances, may be omitted. However, best operation of the venturi-scrubber with highest dust removal efficiency will be attained with the assembly of apparatus as shown in the drawings.

In an actual installation a venturi scrubber was constructed according to the invention and was applied to a 300 ton per day chemical recovery unit used for the incineration of residual liquor obtained in the sulphate pulp and paper process. The throat 12 was constructed with an inside width, between the walls 32 of 13", and of appropriate length. The restrictor 40 was 4" long by 1" wide and proved effective in maintaining a 90 to 95% solids recovery efficiency over a load range of approximately 50 to 100% of rated gas flow, with the restrictor suitably positioned to maintain a desired gas pressure drop of approximately 35" ($H_2O$) through the unit. The rotational or angular adjustment of the deflector within the quadrant of travel may be accomplished manually or automatically with measured gas pressure drop values through the scrubber serving as a controlling guide for securing proper positioning of the restriction within the venturi throat.

While in accordance with the provisions of the statutes we have illustrated and described herein the best form and mode of operation of the invention now known to us, those skilled in the art will understand that changes may be made in the form of the apparatus disclosed without departing from the spirit of the invention covered by our claims, and that certain features of our invention may sometimes be used to advantage without a corresponding use of other features.

We claim:

1. In liquid-gas apparatus, the combination comprising walls defining a gas passage having a throat portion between co-axially arranged converging inlet and diverging outlet portions, means for passing a hot dust-laden gas into the inlet portion of said passage and through said gas passage, means for introducing a liquid in a finely divided condition into the converging portion of said passage, and flow restrictive means positioned in the throat portion of said passage for adjustably changing the cross-sectional flow area thereof including a pivoted damper symmetrically arranged about a pivot axis extending transversely across said throat portion equidistant the opposite walls of said throat portion, said damper having a cross-sectional shape so that in its maximum flow restrictive position it occupies only a minor part of the cross-section of said throat portion, said damper being located downstream in a gas flow sense of said liquid introducing means.

2. In liquid-gas contact apparatus, the combination comprising walls defining a vertically arranged gas passage having a throat portion of elongated rectangular cross-section between co-axially arranged converging inlet and diverging outlet portions, means for passing a hot dust-laden gas downwardly through said passage, means for introducing a liquid in a finely divided condition into the converging portion of said passage, and flow restrictive means positioned in the throat portion of said passage and dividing said passageway into substantially equal flow paths for adjustably changing the cross-sectional flow area thereof including a pivoted damper having a sectional major to minor dimension ratio greater than 2 to 1 and mounted symmetrically about a pivot axis extending across the greater dimension of said throat portion, said damper when positioned in its maximum flow restrictive position occupying only a minor part of the cross-sectional flow area of said throat portion, said damper being located downstream in a gas flow sense of said liquid introducing means.

References Cited by the Examiner

UNITED STATES PATENTS

| | | | |
|---|---|---|---|
| 2,590,905 | 4/1952 | Tomlinson et al. | 55—80 |
| 2,920,858 | 1/1960 | Hunter | 251—305 |
| 3,093,468 | 6/1963 | Krochta | 55—257 X |
| 3,116,348 | 12/1963 | Walker | 261—118 |
| 3,212,235 | 10/1965 | Markant | 55—89 X |

REUBEN FRIEDMAN, *Primary Examiner.*

J. ADEE, B. NOZICK, *Assistant Examiners.*